Figure 1:
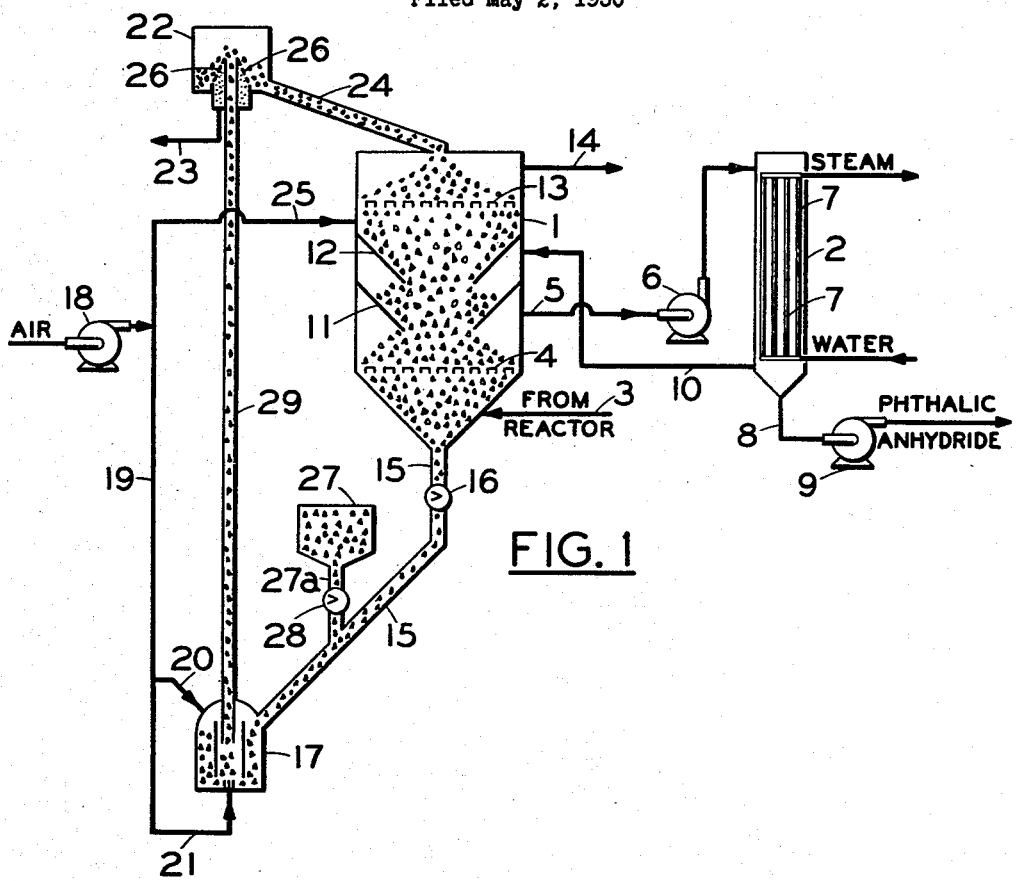

Feb. 15, 1955  C. S. SMITH, JR  2,702,091
RECOVERY OF MOLTEN PHTHALIC ANHYDRIDE
Filed May 2, 1950

INVENTOR
Calvin S. Smith Jr.
BY:
ATTORNEYS

United States Patent Office 2,702,091
Patented Feb. 15, 1955

2,702,091

RECOVERY OF MOLTEN PHTHALIC ANHYDRIDE

Calvin S. Smith, Jr., El Cerrito, Calif., assignor to California Research Corporation, San Francisco, Calif., a corporation of Delaware Application May 2, 1950, Serial No. 159,500

13 Claims. (Cl. 183—119)

This invention relates to a process for recovering phthalic anhydride from the reaction mixtures produced during vapor phase oxidation of hydrocarbons to produce phthalic anhydride. More particularly, the invention relates to a method for recovering molten phthalic anhydride from reaction product mixtures in which all or a substantial portion of the phthalic anhydride remains vaporized and uncondensed in the gas at the melting temperature of phthalic anhydride, and from mixtures in which the partial pressure of phthalic anhydride vapor is less than the vapor pressure of phthalic anhydride in equilibrium with molten phthalic anhydride at its melting point.

Commercial processes for the production of phthalic anhydride by vapor phase oxidation of phthalic anhydride convertible hydrocarbons such as naphthalenes, phenanthrenes, ortho dialkyl benzenes, indenes, and the like, are characterized by the employment of high air hydrocarbon ratios in the air-hydrocarbon mixture introduced into the reactors. The oxidation is accomplished by contacting the hydrocarbon in vapor phase in the presence of a stoichiometric excess of an oxygen-containing gas with a vanadium oxide catalyst at temperatures in the range from about 600° F. to about 1175° F. In the usual commercial practice reaction temperatures from about 800° F. to 1050° F. were found to be satisfactory. Fifteen to forty parts by weight of air to one part by weight of hydrocarbon are commonly charged to the oxidation reactor. The employment of such high air-hydrocarbon ratios in the process is necessary in order to avoid conditions of composition and temperature which produce explosions in the reactors. Because of the high air-hydrocarbon ratios characterizing the charge to the oxidation reactors, the reaction mixture produced has a low phthalic anhydride content. The content of phthalic anhydride in the reaction product produced in most commercial vapor phase hydrocarbon oxidations is so low that upon cooling the reaction product mixture either all or the greater part of the phthalic anhydride which is condensed from the reaction mixture appears in solid form. Economic recovery of phthalic anhydride from such lean reaction mixtures at high yields is difficult to achieve.

A number of methods have been proposed for recovering phthalic anhydride from the reaction product mixture produced in vapor phase oxidation of hydrocarbons to phthalic anhydride and, of these, three appear to have found their way into commercial use. The most widely used method of making commercial recovery of phthalic anhydride from such mixtures is that of passing the reaction product mixture into a large chamber commonly referred to as a "haybarn." In the chamber, the reaction product mixture is cooled and phthalic anhydride crystals condense and settle and adhere to the walls and floor of the chamber. Cooling is effected by the transfer of heat from the exterior chamber walls to the atmosphere. Phthalic anhydride recovery effected by this method of separating the vapor from the reaction mixture is ordinarily in the range 80 to 90% of the total phthalic anhydride content of the reaction product mixture. The phthalic anhydride losses sustained in this method of separating phthalic anhydride vapors from the reaction product mixture are occasioned by a failure to condense a portion of the phthalic anhydride vapor and by the loss of appreciable amounts of the vapor which condenses in the form of finely divided crystals which are carried from the chamber in suspension in the escaping cooled gas. In addition to the substantial losses of phthalic anhydride sustained in the practice of this method, operating costs incident to the removal of the condensed phthalic anhydride from the chamber are high. A hard adherent scale of phthalic anhydride is formed on the immediate surfaces of the walls of the chamber which reduces heat transfer efficiency and periodic removal of this scale, usually by manual means, must be resorted to. A second method of phthalic anhydride recovery which has seen commercial use consists in passing the reaction product mixture through a tubular heat exchanger to effect condensation of solid phthalic anhydride. A cooling liquid is circulated through the tubes of the exchanger and the condensation of solid phthalic anhydride occurs within the chamber and on the surfaces of the tubes. Such heat exchangers are ordinarily employed in parallel flow so that one exchanger may be on stream to the reaction product mixture, while phthalic anhydride is being removed from the other, usually by passing steam through the heat exchanger tubes to melt the solid phthalic anhydride, which is then removed from the chamber of the heat exchanger in liquid form. It is understood that the tubular exchangers have not been entirely satisfactory in operation and that ordinarily a "haybarn" is employed in conjunction with the tubular heat exchanger to effect condensation of residual phthalic anhydride from the portion of the reaction product mixture effluent from the tubular exchanger. A third method which has been employed in recovering the pathalic anhydride is that of subjecting the reaction product mixture to water scrubbing which removes the phthalic anhydride from it. The employment of this method results in the production of a solution of phthalic acid from which phthalic anhydride must be subsequently recovered by evaporating the water. Issued patents have described a method for recovering phthalic anhydride from the reaction product mixtures above described by a method which involves subjecting the reaction product mixture to a sufficient pressure to permit condensation of liquid phthalic anhydride from the reaction mixture at a temperature about 135° C. It has been indicated that where this method is employed a secondary condensing system such as a "haybarn" must be employed. This method does not appear to have been adopted in commercial use, presumably because the cost of pressuring so large a volume of gas to pressures of 30 to 50 pounds gage is economically prohibitive.

It is an object of this invention to provide a method for recovering phthalic anhydride from the reaction product mixture produced in the vapor phase oxidation of hydrocarbons to phthalic acid by which upward of 95% of the total phthalic anhydride content of the reaction mixture is recovered.

It is a further object of this invention to provide a method for recovering phthalic anhydride in liquid phase from gaseous mixtures containing phthalic anhydride which, upon cooling, normally deposit solid phthalic anhydride.

A further object of this invention is to recover molten phthalic anhydride from the reaction product mixture produced in vapor phase oxidation of hydrocarbons to phthalic anhydride which, upon cooling, normally deposits phthalic anhydride in solid phase without recourse to pressure condensation of the phthalic anhydride.

Other and further objects of the invention will be apparent in the following description.

Pursuant to this invention, liquid phthalic anhydride is recovered from the reaction product of vapor phase oxidation of hydrocarbons oxidizable to phthalic anhydride which reaction product normally deposits phthalic anhydride in solid phase upon cooling, by countercurrently contacting the reaction product mixture with a downwardly moving mass of cool, particle-form heat exchange material. The only pressure requirement in the process is that the pressure difference between the point at which the reaction product mixture is introduced into the heat exchange mass and the point at which phthalic anhydride free gas is withdrawn from the mass shall exceed the pressure drop through the mass between these points. In the usual operation of processes for vapor phase oxidation of hydrocarbons to phthalic anhydride, the reaction product mixture flows from the oxidation reactor at a pressure of about 1 to 4 pounds per square inch gauge. This pressure is alone frequently sufficient to cause the flow of the reaction product mixture through the mass of solid heat exchange material and, where it is found insufficient, a small incremental pressure, usually less than 5 p. s. i. g., will suffice to cause the desired flow. The liquid phthalic anhydride produced by the process of the invention may be formed entirely within the body of the heat exchange mass and the molten phthalic anhydride product withdrawn therefrom, or a side-stream of the reaction product mixture enriched in phthalic anhydride is withdrawn from the heat exchange mass at a temperature above its phthalic anhydride dew point and cooled to condense liquid phthalic anhydride in a conventional heat exchanger extrinsic to the heat exchange mass. The uncondensed gas effluent from the extrinsic heat exchanger is returned to the heat exchange mass at a point above that at which the enriched reaction product mixture is withdrawn.

Figure 2:
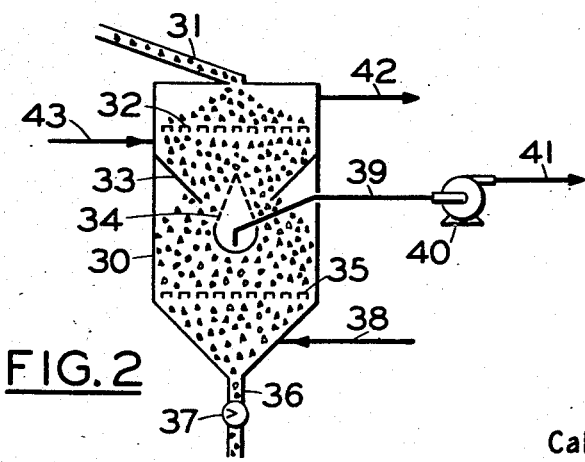

The invention may be better understood by reference to the appended drawings of which Figure 1 is a diagrammatic illustration of a modification of the process of the invention in which molten phthalic anhydride is recovered in a heat exchanger extrinsic to the mass of heat exchange particles with which the reaction product mixture is countercurrently contacted, and Figure 2 is a diagrammatic illustration of a modification of the process of the invention in which liquid phthalic anhydride is produced in and withdrawn from the body of the mass of solid heat exchange particles.

Referring now to Figure 1: A mass of particle-form heat exchange material such as gravel pebbles is moved downwardly through cooling chamber 1. The reaction product mixture effluent from an oxidation reactor in which hydrocarbons such as naphthalene, ortho dialkyl benzenes, phenanthrene, and the like, are oxidized by an oxygen-containing gas, usually air, in contact with a catalyst such as vanadium oxide to produce a lean phthalic anhydride reaction mixture, is introduced into chamber 1 through line 3. The pebbles leave chamber 1 through line 15, their flow being controlled by star valve 16 or other suitable solid flow controlling means. The pebbles flow into chamber 17 from which they are gas-lifted through line 29 into fountain separator 22. Various gases may be employed to effect the lifting of the pebbles from chamber 17 to fountain separator 22, for example, steam or the phthalic anhydride free gas effluent from chamber 1 through line 14; however, it is preferred to employ air at atmospheric temperature for this purpose since by its use lifting and cooling of the pebbles are simultaneously effected. Blower 18 forces air from the atmosphere into manifold line 19, from which it flows into lift pickup chamber 17 through lines 20 and 21. The velocity of the air stream through lines 20 and 21 and the points of its introduction into chamber 17 are adjusted to provide agitation of the pebbles in the chamber and to facilitate the lifting of these pebbles through line 29 to the separator. Operation of a gas lift of this type is understood by those skilled in the art and will not here be described in detail. The lifting of the pebbles from chamber 17 to separator 22 from which they are returned to chamber 1 may, if desired, be effected by the employment of a mechanical elevator of the type commonly employed in many catalytic cranking installations. In fountain separator 22 the velocity of the air rising through line 29 is greatly diminished by reason of the greater cross section of separator 22 and the pebbles carried in the air stream are deposited in the separator. The air passes through gratings 26 into line 23 from which it escapes to the atmosphere. The apertures in gratings 26 are adjusted in size to permit fines produced during the mechanical movement of the pebbles to fall through and escape with the air through line 23 without permitting the pebbles themselves to pass through. From separator 22 the pebbles flow through line 24 into chamber 1. During the travel of the pebbles from chamber 17 to separator 22, a partial cooling is effected, but at the time when they are introduced into the top of chamber 1, their temperature is ordinarily above the maximum temperature permissible at the top of the effective cooling zone of pebble bed. The cooling of the pebbles is completed by withdrawing an air stream from manifold line 19 through line 25 and contacting this air countercurrently with the downwardly moving pebbles. This final cooling step is conducted so as to reduce the temperature of the pebbles laterally aligned with the point of introduction of the air from line 25 to a temperature in the neighborhood of 100° F. It will be noted that the drawing is diagrammatic and indicates only one point of introduction for air from line 25; however, in practice it will be understood that this cooling air is introduced at spaced points around the circumference of chamber 1 in order to insure uniform contacting of the air with the pebbles and uniform cooling. Grate 13 is provided to insure a uniform flow of the pebbles and gas throughout the cross section of chamber 1 and to reduce tendencies toward channeling in the pebble bed. Conical baffles 11 and 12 provide void spaces in chamber 1 from which gas may be withdrawn from and returned to the chamber without the hazard of drawing pebbles into the gas lines and blower. The reaction product gas from the oxidation reactor is introduced into chamber 1 through line 3 at a temperature in the neighborhood of and preferably well above the boiling point of phthalic anhydride.

The manner in which the recovery of liquid phthalic anhydride from reaction product mixtures which normally deposit solid phthalic anhydride upon cooling as effected by the process of the invention will perhaps best be understood by tracing the conditions developed in the pebble bed at the start-up of the process. Before the pebble bed is placed on stream to the reaction product mixture, hot air is introduced into chamber 1 through line 3 to develop a temperature gradient from about 600° F. at the point of the hot air introduction to about 100° F. at the level of grate 13. When the temperature gradient approximating this has been obtained, the reaction product mixture is introduced into chamber 1 through line 3. This mixture flows upwardly through the pebble bed and withdrawal of pebbles through line 15 is initiated to produce a countercurrent contact of the pebbles and the reaction product mixture. Grate 4 serves to distribute the reaction product mixture through the pebble mass and this distribution may be facilitated by providing several points of introduction for the reaction product mixture. As the reaction product mixture rises, it is cooled, and the first phthalic anhydride to be condensed from the mixture is solid phthalic anhydride, which makes its initial appearance at a level in the chamber 1 somewhat above baffle 12. As the pebbles having solid phthalic anhydride deposited on their surfaces move downward through chamber 1, they are brought into contact with the reaction product mixture at increasingly higher temperatures. At these higher temperatures sublimation of the condensed solid phthalic anhydride occurs with the net effect that the up-flowing reaction product mixture is enriched in respect to phthalic anhydride content. Phthalic anhydride cannot come out the top of chamber 1 through line 14 because it is deposited as crystals in the pebble mass as the reaction product mixture is cooled. It cannot come out of the bottom of chamber 1 because the pebbles at the bottom are at a temperature above the boiling point of phthalic anhydride and there is no gas flow out of the bottom of the chamber. As the column is operated a "pinch zone" is established in the middle portion of the pebble mass in which a liquid phase of phthalic anhydride appears. The liquid phase is produced as a result of the enrichment of the reaction product mixture by sublimation of solid phthalic anhydride crystals contained on the downwardly moving pebbles. This enrichment continues until the phthalic anhydride dew point of the enriched reaction product mixture is above the melting point of phthalic anhydride, at which condition cooling below the dew point causes condensation of phthalic anhydride in liquid phase. After a liquid phase has been established in the central portion of the reactor, the pebbles continue to move downwardly countercurrent to the hot reaction product mixture rising through the chamber. The rising gases evaporate liquid phthalic anhydride from the surfaces of the pebbles and this evaporation enriches the reaction product mixture in respect to phthalic anhydride content. A portion of the rising gases is withdrawn from chamber 1 through line 5 at a point at which the temperature of the gases is in the range 300 to 350° F. and above the phthalic anhydride dew point of the enriched reaction product mixture at the point of withdrawal. The gas withdrawn from chamber 1 through line 5 is forced by blower 6 into tubular heat exchanger 2, where it is cooled to a temperature below its phthalic anhydride dew point, but above the melting point of phthalic anhydride to effect condensation of liquid phthalic anhydride A cooling liquid, usually water, is circulated through tubes 7 of the tubular heat exchanger. Liquid phthalic anhydride accumulates in the bottom of heat exchanger 2 and is withdrawn from the exchanger through line 8 and pumped by pump 9 to storage or purification facilities. Uncondensed gases are removed from heat exchanger 2 through line 10 and returned to chamber 1, being introduced to chamber 1 at a point in the chamber where a liquid phthalic anhydride phase is present on the pebble surfaces. The gases re-introduced into chamber 1, through line 10, and gases which had previously been introduced through line 3 and not withdrawn through line 5 rise through the pebble bed countercurently contacting progressively cooler pebbles to effect condensation of residual phthalic anhydride contained in the gases in the form of phthalic anhydride crystals in the upper portion of chamber 1. As these crystals move downwardly in the chamber, they are subjected to higher temperatures and ultimately melted. The fixed gases contained in the reaction product mixture are removed from chamber 1 through line 14 substantially completely free of phthalic anhydride. The gases effluent from chamber 1 through line 14 may be water scrubbed for the removal of minor amounts of low boiling organic materials prior to their release to the atmosphere. Hopper 27 is a storage hopper for fresh pebbles which are introduced into the system to replace pebbles lost by attrition. Slide valve 28 in line 27a is operated as required to permit flow of fresh pebbles into line 15.

Figure 2 of the appended drawings illustrates a modification of the process of the invention in which liquid phthalic anhydride is recovered by the employment of a trap-out tray disposed in the interior of the pebble mass. Pebbles are introduced into chamber 30 through line 31 and flow downwardly through the chamber through distributing grate 32, past conical baffle 33, through gas distributing grate 35 and out of the chamber through line 36 controlled by star valve 37. The reaction product mixture is introduced into chamber 30 through line 38 and rises through the pebble bed in countercurrent contact with the downwardly moving pebbles. A liquid phthalic anhydride phase is developed in the central portion of the reactor as the result of enrichment of the reaction product mixture during its rise through the pebble bed by evaporation of phthalic anhydride condensed on the pebbles at a higher point in chamber 30. Trap-out tray 34 is disposed in the central portion of the reactor and is provided with a perforated conical upper portion which permits the flow of liquid phthalic anhydride into the tray, the openings being too small to permit the passage of the pebbles into the tray. Liquid phthalic anhydride is withdrawn from the lower portion of the tray through line 39 and is pumped by pump 40 through line 41 to storage or purification facilities. Cooling air is introduced into the upper portion of chamber 30 through line 43 in the manner previously described with reference to Figure 1, and gases substantially free of phthalic anhydride are withdrawn from chamber 30 through line 42. Some fines produced by a breakup of the pebbles in the pebble bed of chamber 30 find their way through the perforations of trap-out tray 34 into its lower portion. These fines are removed together with the phthalic anhydride and are separated from it by filtration or settling.

It is desirable that there be no flow of the reaction product mixture from the pebble chamber through line 15 in the case of Figure 1, or through line 36 in the case of Figure 2. Star valve 16 or 37, in the respective figures, retard the passage of the gas from the chambers in considerable degree and a sufficient back pressure is developed in lines 15 and 36 from the gas introduced into pickup chamber 17 to insure that no flow of the reaction product mixture from the pebble chamber through lines 15 or 36 will occur. In the event that a mechanical elevator is employed in the process rather than the gas lift illustrated in Figure 1, then the introduction of a sealing gas in line 15 at a point below star valve 16 is desirable in order to prevent down-flow of the reaction product mixture.

No problem of pressure drop has been encountered in the pebble bed either by reason of the condensation of solid phthalic anhydride crystals in its upper portion or the development of a liquid phase on the pebble surfaces in the central portion. The void space in the pebble bed amounts to approximately 45% of the total volume of the pebble chamber, and the maximum deposit of phthalic anhydride crystals in the upper portion of the chamber which has been encountered is sufficient only to decrease the void volume of a typical pebble mass from about 45% to about 40% and this has no significant effect on the flow of gas through the pebble bed containing the deposited crystals.

On prolonged use of a single lot of pebbles in recovering phthalic anhydride by the process of this invention, some accumulation of heavy reaction products on the pebble surfaces may be observed. When the use of the pebbles is sufficiently prolonged, this accumulation may become sufficiently heavy to cause the pebbles to show a tendency to agglomerate. This hazard can be eliminated by withdrawing from line 15 at the base of chamber 1 a small side stream of pebbles and subjecting them to contact with air at a high temperature in the neighborhood of 1000° F. to burn off residual carbonaceous material. The pebbles so treated are then returned to chamber 17 and re-enter the pebble bed for further contact with the reaction product mixture.

In the practice of the invention the rate at which the pebbles are introduced into chamber 1 and their temperature at introduction must be coordinated with the rate at which the reaction product mixture is introduced into the base of the chamber, its temperature, and its phthalic anhydride content. The process is fully and efficiently operative if the rates of pebble introduction and reaction product mixture introduction are adjusted with respect to each other so that the reaction product mixture is ultimately cooled in the pebble bed to a temperature below 200° F., and preferably to a temperature in the range 100 to 150° F. In the modification of the process described with reference to Figure 1, the minimum temperature is reached at a level in chamber 1 adjacent to distribution grate 13. This occurs because the pebbles are only partially cooled at the time of their introduction into chamber 1 through line 24 and the cooling is completed within the chamber by contacting the pebbles countercurrently with cold air introduced through line 25. The cooling procedure can readily be modified so that the entire cooling of the pebbles to a temperature of 90 to about 125° F. suitable for immediate use in the condensation of phthalic anhydride would be accomplished prior to their introduction into chamber 1.

The reaction product mixture effluent from the oxidation reactor may have a temperature in the range from about 400° F. to about 1000° F., and normally is at a temperature from about 700° F. to about 980° F. Prior to its introduction into the pebble bed in chamber 1, this reaction mixture is desirably cooled to a temperature below about 700° F., but near or above the boiling point of phthalic anhydride, for example, to a temperature in the range about 450 to 700° F. and preferably in the range 550–700° F. Its temperature is preferably well above the boiling point of phthalic anhydride so that any liquid film of phthalic anhydride adhering to the surfaces of the pebbles descending to the bottom of chamber 1 will be evaporated from their surfaces before they leave the chamber. It is desirable that the temperature should not exceed about 700° F. for two reasons. The first reason is that a larger pebble mass and higher rate of circulation of pebbles would be required to effect the necessary cooling of the gas introduced at higher temperature and preliminary cooling to about 700° F. may be effected more economically by conventional heat exchange methods. The second reason is that it has been observed that at temperatures above about 700° F. the reaction product mixture shows a tendency to undergo further oxidation in the pebble bed and heating may occur in the bed due to this oxidation rather than the cooling which is intended. The phthalic anhydride content of the reaction product mixture produced in catalytic air oxidation of hydrocarbons to phthalic anhydride is typically in the range about 0.031 to 0.038 pounds of phthalic anhydride per pound of air. The frost point of these mixtures at normal pressure is commonly in the range about 258 to 262° F. The phthalic anhydride concentration in air which is in equilibrium with molten phthalic anhydride at its melting point is 0.041 pounds of phthalic anhydride per pound of air. In the countercurrent contact of the pebble mass with the reaction product mixture, the phthalic anhydride content of the reaction product mixture is increased to an amount substantially above 0.041 pounds per pound of air such that the dew point of the mixture with respect to phthalic anhydride is substantially above the phthalic anhydride melting point. From the specific heat of the solid heat exchange material, the phthalic anhydride content of the reaction product mixture, the temperature of the reaction product mixture and the specific heat of the reaction product mixture, the quantity of a particular heat exchange material which must be contacted with a given amount of the reaction product mixture in the process of the invention to effect condensation of its phthalic anhydride content can be calculated, the initial operation of the process can be guided by the calculation and adjustments in the rate of pebble movement may be made to correct minor deviations from the calculated result.

Losses from the pebble bed by reason of either incomplete condensation of phthalic anhydride or the development of phthalic anhydride dust have been determined at various temperatures of operation and have been found surprisingly low. To test for losses of phthalic anhydride from the top of the column, a sample stream of gas from the unit was led to a Buchner filter where the gas stream was filtered through two No. 40 Whatman papers prewetted. The gas sample was metered with a wet test meter. At the end of the run the sample was collected by washing the connecting lines and filter paper with acetone. The acetone sample was titrated with caustic and corrected for maleic anhydride by determining the latter with permanganate in the usual manner. Phthalic anhydride loss is reported below as weight per cent of the phthalic anhydride in the gas entering the recovery unit.

| Sample | Percent loss | Pebbles | Exit temperature, °F. |
|---|---|---|---|
| Pebble Bed Run 7, Sample 1 | 0.104 | ¼" gravel | 90–95 |
| Pebble Bed Run 7, Sample 2 | .128 | do | 120 |
| Pebble Bed Run 7, Sample 3 | .08 | do | 95–105 |
| Pebble Bed Run 11, Sample 1 | 2.7 | ½" marbles | 180–190 |

When these results are plotted on the curve for vapor pressure loss, it is shown that the loss from the top of the column is in the magnitude of the vapor pressure loss only, indicating negligible loss of solid phthalic anhydride. At the time of these tests 15.1 ft.³/min. at 0.8 atm. and 100 to 200° F. was being discharged from the unit. This was equivalent to a superficial velocity of 2.9 ft./sec. in the empty column at the discharge conditions.

Some loss of phthalic anhydride may be occasioned during the contact of the pebbles withdrawn from chamber 1 with cooling air, if the temperature at which pebbles are withdrawn or the temperature of the reaction product mixture with which they are contacted as they leave the chamber is too low. This loss may be controlled by adjusting the pebble outlet temperature, higher temperatures favoring lower losses. It is possible that some phthalic anhydride would be adsorbed permanently on the pebbles and would not be removed either in stripping or cooling; this would be recycled. The following analyses were obtained on the ¼" gravel:

| Run and Sample Number | Temperature of feed contacting withdrawn pebbles, °F. | Phthalic anhydride percent by weight on pebbles | Phthalic anhydride percent by weight of incoming phthalic anhydride |
|---|---|---|---|
| PB–11–2 | 500–600 | 0.04 | 1.25 |
| PB–5–1 | 500 | .029 | .93 |
| PB–7–6 | 600 | .027 | .81 |

The analyses were made by the following method: 220–250 gms. of pebbles were weighed into a beaker. Water to cover the pebbles was added and the sample was boiled for 15 minutes. The solution was filtered and titrated to a phenolphthalein end point with a 0.1 N NaOH. The titration was calculated as phthalic anhydride. This procedure should indicate both adsorbed and strippable phthalic anhydride.

In general, with normal operation there were no indications of thermal or oxidative decomposition. No noticeable tars or coke were deposited on the pebbles and the color and purity of the product was superior to the normal melt tank crude from haybarn recovery. Gas samples of the feed and exit gas were taken simultaneously and analyzed by mass spectrometer. Any oxidation should appear as a change in gas composition.

| | Test run PB–9–2 Bottom column (in) | Test run PB–9–1 Top column (out) |
|---|---|---|
| | Percent | Percent |
| CO | 1.4 | 1.3 |
| N$_2$ | 81.6 | 81.6 |
| O$_2$ | 13.7 | 13.7 |
| CO$_2$ | 2.9 | 2.9 |
| Propane (?) | .4 | .5 |
| | 100.0 | 100.0 |

In one test made during introduction of the reaction product mixture into the pebble bed at a temperature in excess of 700° F., there was evidence of exothermic reaction in the pebble mass and a small increase in the CO$_2$ content of the out gas was noted.

As indicated above, the reaction product mixture effluent from the oxidation reactor is ordinarily at a pressure in the range about 1 to 4 pounds per square inch gauge. The pressure required to cause the flow of the gas through the pebble mass in chamber 1 is not ordinarily in excess of about 5 pounds per square inch gauge and, accordingly, the reaction product mixture effluent from the oxidation reactor is sometimes at a sufficient pressure to induce the desired flow. In most instances it will be necessary to provide a pressure booster in the form of a blower, for example, to increase the pressure of the reaction product mixture from its level at the point of exit from the oxidation reactor to a pressure in the order of 5 pounds per square inch gauge.

The reaction product mixture has been passed through the pebble bed at superficial velocities based on velocity in the empty pebble chamber of 1 to 8 feet per second without encountering difficulties in obtaining the required rapidity of cooling and without encountering fogging at the exit from the pebble bed by reason of entrainment of finely divided phthalic anhydride particles in the effluent gas or shock chilling to produce phthalic anhydride dust.

The heat exchange particles with which the pebble chamber 1 is packed may be composed of any durable heat-stable solid material. The particles preferably have a high heat capacity and reasonably good heat conductivity. While porous particles such as silica-alumina cracking catalysts have been employed successfully, it is preferred to employ a substantially non-porous heat exchange material. Gravel pebbles of suitable size are an ideal heat exchange material, but glass marbles, screened quartz chips of suitable size, Carborundum, Alundum, mullite, kaolin, ceramic materials, metal pellets or shot composed of metals which are not catalytically active in promoting oxidation at temperatures up to 700° F., and other similar materials are suitable for use in the process. It is preferred to employ heat exchange particles of fairly large size since their employment provides a somewhat larger void volume and lower pressure drop in the mass of heat exchange material and the amount of particle surface which is actually in contact with the surface of another particle is smaller when fairly large particles are employed. Particles in the size range of about 1 to 5 mesh on the Tyler standard screen scale are suitable, and particles which pass through a 3 mesh screen and are held on a 5 mesh screen are preferred. In the processing of a typical reaction product mixture produced in catalytically oxidizing either naphthalene or ortho xylene to phthalic anhydride, a pebble flow rate of approximately 1 to 2 pounds of pebbles per pound of reaction product mixture introduced into the pebble bed produces a satisfactory degree of cooling and a high phthalic anhydride recovery in the process of the invention.

The flow of pebbles has proven satisfactory in all portions of the pebble bed. In the upper portion of the pebble bed where solid phthalic anhydride is condensed, the flow appears to be somewhat retarded, but the pebbles do not stick together or bridge. The walls of the vessel are generally clean and no flow stoppage is developed. In the central portion of the pebble bed where liquid phthalic anhydride is condensed on pebble surfaces, the flow is free and regular and approximately of the same character as the flow of pebbles wetted with water. In the lower portion of the pebble bed which may be characterized as a stripping zone in that liquid phthalic anhydride is stripped from the surface of the pebbles by the on-coming reaction product mixture at elevated temperature, the pebbles are dry and free of phthalic anhydride and the flow is the same as for clean fresh pebbles. The only point in the pebble chamber in which any tendency of the pebbles to agglomerate has been observed is in the area adjacent to the chamber walls at the interface of the solid and liquid phthalic anhydride phases. In a pebble bed of large diameter, for example, 8 to 10 feet, this problem is not serious and no special measures need be taken to meet it. If desired, all hazard of pebble flow difficulty in this area may be eliminated by providing strip heaters on the exterior surface of the chamber shell in the area adjacent to the solid liquid interface.

Conditions suitable for the operation of a commercial scale pebble bed phthalic anhydride recovery unit similar to that described with reference to Figure 1 are as follows: Gravel pebbles are moved through the pebble bed at a rate of 48 tons per hour. 58,280 pounds per hour of the reaction product mixture produced in catalytic oxidation of a hydrocarbon to phthalic anhydride and containing 1940 pounds of phthalic anhydride and 340 pounds of maleic anhydride are introduced into the pebble bed. Partially cooled and enriched reaction product mixture is withdrawn from the pebble bed at a rate of about 2700 s. c. f./min. and at a point where its temperature is about 330° F. and subjected to cooling to a temperature of about 302° F. in a heat exchanger external to the pebble bed. 1936 pounds per hour of phthalic anhydride are recovered. When liquid phthalic anhydride is recovered in an external heat exchanger the volume of the enriched side stream withdrawn from the pebble bed is adjusted so that the phthalic anhydride condensed from it in the external exchanger in a given time period is at least equal to the phthalic anhydride contained in the reaction product mixture introduced into the pebble bed in a like period. The cooled uncondensed gas is returned from the external heat exchanger to the pebble bed and is introduced into it at a temperature of about 302° F. at a point in the bed where liquid phthalic anhydride is condensing on the pebbles. Pebbles are withdrawn from the bed at a temperature approaching 700° F. and are cooled in the gas lift to a temperature of about 425° F. Cooling is completed by introducing 35,400 pounds per hour of cooling air at atmospheric temperature (circa 70° F.) into the pebble bed at a point below the upper distribution plate. The cooling air and uncondensed portion of the reaction mixture is withdrawn from the top of the pebble bed chamber at a temperature of about 415° F. and directed to a water scrubber for fume disposal.

The following examples are presented to illustrate the operation of the process of the invention and are to be regarded as illustrative rather than limiting.

*Example 1.*—A pebble bed corresponding to that illustrated in Figure 2 and employing trap-out trays disposed in the central portion of the pebble mass was employed in this example. The pebble bed was 4 inches in diameter and the point of introduction of the reaction product mixture was separated from the point at which the phthalic anhydride-free gas was withdrawn by an interval of 5 feet. Trap-out trays were disposed in the bed at points 2 feet and 2½ feet below the point at which the gas left the bed. Three mesh gravel pebbles were moved through the bed at the rate of 1 pound of pebbles per pound of reaction product mixture introduced. The reaction mixture was introduced into the bed at a temperature of 500° F. and phthalic anhydride free gas was withdrawn from the top of the bed at temperatures ranging from 105 to 145° F. during a two-hour run. The total gas flow during the run measured at the exit temperature and pressure was 19 C. F. M. at discharge conditions. Instead of applying pressure to force the gas through the pebble bed, a suction was applied at the gas exit orifice and pressure at the point of gas introduction was minus one inch of mercury. Liquid phthalic anhydride was withdrawn from the trap-out trays and the pebbles emerged from the bottom of the pebble bed dry and clean at a temperature of approximately 500° F. Analysis of the gas effluent from the upper portion of the pebble bed showed a phthalic anhydride content less than 1%. The liquid phthalic anhydride recovered had a purity of 98.1%. Calculation based on the phthalic anhydride content of the reaction product mixture, analysis of liquid phthalic anhydride recovered, and phthalic anhydride content of the gas effluent from the pebble bed indicated total phthalic anhydride loss during the recovery process of 0.92% of the phthalic anhydride contained in the feed to the unit.

*Example 2.*—A 4 hour run was made under conditions similar to those described in Example 1 employing silica alumina cracking catalyst beads as the particle-form heat exchange material. Liquid phthalic anhydride was recovered but this porous type material adsorbed liquid phthalic anhydride to a degree such that not all of the adsorbed material was removed by contact with the hot reaction product mixture introduced at the bottom of the bed and consequently a portion of the liquid phthalic anhydride solidified within the pores of the beads when they were cooled. Mechanical forces set up within the bead pores during the phase change caused a rather high rate of attrition of the silica-alumina beads. Accordingly, it is preferable to employ a non-porous type heat exchange particle in order to avoid excessive losses due to attrition. However, this run was of considerable interest since the gas effluent from the pebble bed packed with silica-alumina particles had virtually no content of lower boiling organic materials and could be released to the atmosphere without scrubbing and without the hazard of creating any type of fume problem. Properly annealed silica alumina beads having considerably higher resistance to attrition may be employed in the process and the desirable result that no fume is released to the atmosphere obtained without incurring the high attrition losses.

*Example 3.*—This example was conducted in a pebble chamber 4 inches in diameter and having a 5 ft. interval between the point of reaction product introduction and phthalic anhydride free gas withdrawal. In this example phthalic anhydride was recovered in an external heat exchanger in the manner illustrated in Figure 1 of the drawings. Reaction product from the oxidation reactor was introduced into the pebble bed packed with 3 mesh gravel pebbles at temperatures in the range 500 to 600° F. The reaction mixture was drawn through the pebble bed by suction applied at the gas outlet at the top of the column and pressure at the bottom of the column was −0.5 inches of mercury. Pressure at the exhaust orifice was −5.5 inches of mercury. Enriched reaction product mixture was withdrawn from the pebble bed at a point where its temperature was approximately 325° F. and cooled in an external heat exchanger to condense liquid phthalic anhydride. Uncondensed gas was returned from the external heat exchanger to the pebble bed at a point in the bed where liquid phthalic anhydride was present on the surfaces of the pebbles. During a run of 124 minutes, 1106 grams of liquid phthalic anhydride were recovered from the external heat exchanger.

*Example 4.*—A run was conducted under conditions similar to those described in Example 3 in which ⅝ inch glass marbles were employed as the heat exchange material in the pebble bed. During the run the reaction product mixture was introduced into the pebble bed at temperatures in the range 500 to 600° F. The pressure at the point of introduction of the reaction product mixture was 0.2 inches of mercury, and the pressure at the point at which the phthalic anhydride free gas was withdrawn from the upper portion of the pebble bed was −2.2 inches of mercury. Fixed gases contained in the reaction product mixture were withdrawn at the top of the pebble bed substantially free of phthalic anhydride at a temperature which did not exceed 160° F. during a 3 hour run. Liquid phthalic anhydride was recovered by withdrawing enriched gas from an intermediate point in the pebble bed and cooling it in an external heat exchanger.

When a small pebble bed similar to that described in connection with the above examples was connected to a commercial oxidation reactor, the phthalic anhydride recovered in the pebble bed averaged a phthalic anhydride content in excess of 98% by weight. During the sa period the phthalic anhydride recovered from the sa unit in the haybarns showed a phthalic anhydride conte. of 95.5%. A considerable portion of the contamination of the haybarn product is attributable to a higher maleic acid content. The color of the phthalic anhydride recovered in the pebble bed was 500+ on the Hazen color scale, while that deposited in the haybarn was quite black.

The reaction product mixture introduced into the pebble bed has an appreciable content of maleic anhydride. The process can be modified to effect a substantial recovery of the maleic anhydride contained in the stream of the reaction product mixture by employing solid heat exchange particles having a very low porosity such as glass marbles and wetting these pebbles with water prior to their introduction into the contacting chamber. The wetted pebble fed to the top of the column rides down the column contacting uprising phthalic anhydride and maleic anhydride containing gas. This gas is scrubbed free of maleic anhydride by reaction with the water film on the pebble. The water dries as the pebble passes into the warmer zones in the lower portion of the pebble mass, leaving a maleic acid film. This in turn rides into a zone hot enough to dehydrate the acid to the anhydride. The maleic anhydride cannot leave the top of the column because it is scrubbed out by contact with the water film on the wetted pebbles, and it cannot leave the bottom of the column because of the temperature barrier. A "pinch zone" is thus established in which either trap-off trays or an extrinsic condenser are used for the recovery of a liquid phase of phthalic and maleic anhydrides. Any fumaric acid formed rides into a sufficiently hot zone to isomerize it to maleic acid and dehydrate it to maleic anhydride. As shown hereinbefore, this recovery system can be used for the recovery of maleic anhydride together with phthalic anhydride, whereupon the separation of maleic anhydride from phthalic anhydride by fractional distillation offers no serious difficulties. Of course, the same system can be used to recover maleic anhydride alone in the manufacture thereof by vapor phase catalytic oxidation of benzene. In recovering maleic anhydride by the method just described, it is important that the water content of the wetted pebbles be low. If it exceeds 0.5% by weight by a very appreciable amount, evaporation of the water leads to rather high gas temperatures in the gas entering the wetted pebble zone. This causes the conveyance of phthalic anhydride into the wet zone where a considerable part of it reacts to form phthalic acid which tends to cause cementing of the pebbles and blocking of the pebble flow.

While the invention has been described with particular reference to the recovery of phthalic anhydride and maleic anhydride, it should be noted that the invention is applicable to the separation and recovery of other materials similar in nature to these anhydrides and generally to the removal of sublimable compounds for heated charge gas containing in vapor state relatively small amounts of materials whose condensation temperature is substantially higher than the condensation temperature of the charge gas exclusive of such compounds.

I claim:

1. The method of recovering phthalic anhydride from a gaseous reaction product mixture which comprises introducing the reaction product mixture at a temperature above 400° F. into the lower portion of a downwardly moving bed of solid inorganic heat exchange particles having a size greater than five mesh, and having a temperature gradient ranging from a temperature below the melting point of phthalic anhydride in its upper portion to a temperature above about 400° F. in its lower portion, withdrawing cooled gas from the upper portion of said mass at a temperature substantially below the melting point of phthalic anhydride and withdrawing gas containing phthalic anhydride vapor at a concentration such that the phthalic anhydride dew point of the gas is higher than the melting point of phthalic anhydride from an intermediate portion of said mass.

2. The improved method of separating phthalic anhydride from a gaseous mixture in which phthalic anhydride is present in amounts such that its partial pressure is less than the vapor pressure of liquid phthalic anhydride at its melting point, which comprises introducing the gaseous mixture at a temperature above about 400° F. into the lower portion of a downwardly moving mass of high melting solid inorganic granular heat exchange material, cooling the gaseous mixture by countercurrent contact with the solid material, withdrawing from the upper portion of said mass cooled gas at a temperature substantially below the melting point of phthalic anhydride, and withdrawing gas containing phthalic anhydride vapor at a concentration such that the phthalic anhydride dew point of the gas is higher than the melting point of phthalic anhydride from said mass at a point intermediate the point of introduction of the reaction mixture and the point of withdrawal of the cooled gas.

3. The method of recovering liquid phthalic anhydride from a gaseous mixture having a low content of phthalic anhydride such that solid phthalic anhydride is condensed from it on normal cooling, which comprises introducing said mixture at a temperature above about 400° F. into the lower portion of a downwardly moving mass of solid inorganic heat exchange particles having a temperature gradient ranging from a temperature below the melting point of phthalic anhydride in its upper portion to a temperature above about 400° F. in its lower portion, withdrawing normally gaseous components of the mixture substantially free of phthalic anhydride from the upper portion of said mass, thereby producing in the intermediate portion of said mass a phthalic anhydride enriched gas having a phthalic anhydride content such that its phthalic anhydride dew point is above the melting point of phthalic anhydride and cooling said phthalic anhydride enriched gas to condense liquid phthalic anhydride.

4. The method as defined in claim 3, wherein the phthalic anhydride enriched gas is cooled by direct heat exchange with the mass of heat exchange particles.

5. The method as defined in claim 3, wherein a substantial portion of the phthalic anhydride enriched gas is withdrawn from the mass of heat exchange particles and cooled by contact with a heat exchange surface extrinsic to said mass.

6. The method of recovering liquid phthalic anhydride from a gaseous mixture having a low content of phthalic anhydride such that solid phthalic anhydride is condensed from it on normal cooling, which comprises introducing said mixture at a temperature in the range from about 400° F. to about 1000° F. into the lower portion of a downwardly moving mass of solid inorganic heat exchange particles having a temperature gradient ranging from a temperature in the range from about 100 to 150° F. in its upper portion to a temperature in the range from about 450 to 700° F. in its lower portion, withdrawing normally gaseous components of the mixture essentially free of phthalic anhydride from the upper portion of said mass, thereby producing in the intermediate portion of said mass a phthalic anhydride enriched gas having a phthalic anhydride content such that its phthalic anhydride dew point is above the melting point of phthalic anhydride and cooling said phthalic anhydride enriched gas to condense liquid phthalic anhydride.

7. The method as defined in claim 6, wherein the phthalic anhydride enriched gas is cooled by direct heat exchange with the mass of heat exchange particles.

8. The method as defined in claim 6, wherein a substantial portion of the phthalic anhydride enriched gas is withdrawn from the mass of heat exchange particles and cooled by contact with a heat exchange surface extrinsic to said mass.

9. The method of recovering liquid phthalic and maleic anhydrides simultaneously from a hot gaseous mixture containing phthalic anhydride vapor and maleic anhydride vapor, which comprises countercurrently contacting a stream of said gaseous mixture containing phthalic and maleic anhydrides with a downwardly moving mass of particle-form high melting solid inorganic heat exchange material having a temperature gradient ranging from about 100 to 200° F. in its upper portion to about 450 to 700° F. in its lower portion; maintaining this particle-form solid heat exchange material in the uppermost portion of said moving mass in a water-wetted condition; cooling said stream of gaseous mixture in said moving mass by countercurrent contact with said particle-form solid heat exchange material; withdrawing from the upper portion of said mass of heat exchange material at a temperature below about 150° F. a mixture of the normally gaseous components of the original mixture, said gaseous components being substantially free of phthalic and maleic anhydrides; withdrawing a liquid-phase mixture of phthalic and maleic anhydrides from the middle portion of said mass of heat exchange material; and recovering said maleic anhydride from this mixture thereof with phthalic anhydride by fractional distillation.

10. The method of recovering liquid phthalic anhydride from a hot reaction product mixture which comprises introducing the mixture into the lower portion of a downwardly moving mass of high melting solid inorganic granular heat exchange material, maintaining a temperature gradient in the mass of granular heat exchange material ranging from a temperature above about 400° F. in the lower portion of the mass to a temperature below the melting point of phthalic anhydride in the upper portion of the mass, withdrawing from the upper portion of said mass cooled gas at a temperature substantially below the melting point of phthalic anhydride, withdrawing liquid phthalic anhydride from said mass at a point intermediate the point of introduction of the reaction mixture and the point of withdrawal of the cooled gas and withdrawing hot granular solid essentially free of phthalic anhydride from the lower portion of the mass.

11. The method of separating phthalic anhydride from a gaseous mixture in which phthalic anhydride is present in amounts such that its partial pressure is less than the vapor pressure of liquid phthalic anhydride at its melting point, which comprises introducing the gaseous mixture at a temperature above about 400° F. into the lower portion of a downwardly moving mass of high melting solid inorganic granular heat exchange material, cooling the gaseous mixture by countercurrent contact with the solid mass, withdrawing from the upper portion of said mass cooled gas at a temperature substantially below the melting point of phthalic anhydride, withdrawing from said mass at a point intermediate the point of introduction of the gaseous mixture and the point of withdrawal of the cooled gas a gas stream containing phthalic anhydride vapor at a concentration such that the phthalic anhydride dew point of the gas stream is higher than the melting point of phthalic anhydride, condensing from said gas stream liquid phthalic anhydride, and returning the non-condensed portion of said gas stream to an upper portion of said mass.

12. A process for removing a gaseous organic anhydride from charge gas containing gaseous organic anhydride whose partial pressure is less than the vapor pressure of said organic anhydride at its normal melting temperature and having a temperature exceeding the atmospheric boiling temperature of said organic anhydrides, including passing said charge gas upwardly through a gravitating bed of recycling granular solids, said bed having substantially uniform temperature progressively graduated from a temperature at the bottom substantially equal to the temperature of said charge gas to a lower temperature at the top of said bed substantially below condensation temperature of said organic anhydride and being supplied with wet solids water-cooled to said lower temperature, elevating and at least partially cooling the solids discharged from the bottom of said bed by means of a steam lift, removing from an intermediate portion of said bed a portion of gas enriched in organic anhydride by revaporization of said condensed particles contained therein, condensing liquid organic anhydride from the gas removed from the intermediate portion of said bed, and reintroducing to an upper portion of said bed the non-condensed portion of the gas removed from the intermediate portion of said bed.

13. A process for removing sublimable compounds from heated charge gas containing in vapor state relatively small amounts of such compounds whose condensation temperature is substantially higher than the condensation temperature of the charge gas exclusive of such compounds, comprising passing said charge gas upwardly through a gravitating bed of inert granular contact solids having a substantially uniform temperature gradient between a temperature substantially below the condensation temperature of said compounds at the top of said bed and a temperature substantially above the vaporization temperature of said compounds at the bottom of said bed, condensing and depositing said compounds on said contact solids in the upper portion of said bed, utilizing the heat of said charge gas in the lower portion of said bed to revaporize said compounds condensed and deposited on said contact solids from said upper portion of said bed thereby producing in an intermediate region of said bed a zone of enriched gas containing relatively large amounts of said compounds in vapor state, removing at least a part of said enriched gas from said intermediate region, condensing from said enriched gas at least some of said compounds to leave a lean gas, returning said lean gas to said bed immediately above said intermediate region to further condense from said lean gas residual amounts of said compounds, removing from said bed a gas fraction substantially free of said compounds, and continuously recycling said solids by passage through said bed, a region below said bed, a gas lift to a region above said bed with concomitant adjustment of the temperature of said solids by heat exchange provisions including relatively cooler lift gas and coolant fluid contact in said lift and said region above said bed, and from said region above said bed to the top of said bed.

References Cited in the file of this patent

UNITED STATES PATENTS

| | | |
|---|---|---|
| 2,142,678 | Porter | Jan. 3, 1939 |
| 2,441,873 | Downs | May 18, 1948 |
| 2,448,868 | Davis | Sept. 7, 1948 |
| 2,537,044 | Garbo | Jan. 9, 1951 |
| 2,580,635 | Winter, Jr. | Jan. 1, 1952 |
| 2,583,013 | Patterson | Jan. 22, 1952 |
| 2,607,440 | Lewis | Aug. 19, 1952 |

FOREIGN PATENTS

| | | |
|---|---|---|
| 587,774 | Great Britain | May 6, 1947 |